(12) United States Patent
Ishii

(10) Patent No.: US 7,027,841 B2
(45) Date of Patent: Apr. 11, 2006

(54) CALL OPERATION METHOD FOR A COMMUNICATION DEVICE

(75) Inventor: Atsushi Ishii, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 474 days.

(21) Appl. No.: 10/074,480

(22) Filed: Feb. 11, 2002

(65) Prior Publication Data

US 2003/0166409 A1    Sep. 4, 2003

(51) Int. Cl.
*H04M 1/00* (2006.01)

(52) U.S. Cl. ............................... 455/569.1; 455/569.2; 455/575.2

(58) Field of Classification Search ................ 455/567, 455/569.1, 569.2, 458, 566, 575.1, 575.2
See application file for complete search history.

(56) References Cited

U.S. PATENT DOCUMENTS

| | | | |
|---|---|---|---|
| 4,975,949 A | 12/1990 | Wimsatt et al. | |
| 5,191,602 A | 3/1993 | Regen et al. | |
| 5,426,689 A | 6/1995 | Griffith et al. | |
| 5,557,653 A | 9/1996 | Paterson et al. | |
| 5,596,638 A | 1/1997 | Paterson et al. | |
| 5,608,794 A | 3/1997 | Larson | |
| 5,794,163 A * | 8/1998 | Paterson et al. | 455/575.2 |
| 5,825,873 A | 10/1998 | Duncan et al. | |
| 6,078,825 A | 6/2000 | Hahn et al. | |
| 6,195,570 B1 * | 2/2001 | Ishida | 455/566 |
| 2002/0016188 A1 | 2/2002 | Kashiwamura | 455/566 |
| 2002/0049079 A1 * | 4/2002 | Buckley et al. | 455/568 |

FOREIGN PATENT DOCUMENTS

EP    1 154 621 A1    5/2000

OTHER PUBLICATIONS

Office Action from Korean Patent Office.

* cited by examiner

*Primary Examiner*—George Eng
*Assistant Examiner*—Wesley Kim
(74) *Attorney, Agent, or Firm*—Chernoff, Vilhauer, McClung & Stenzel

(57) ABSTRACT

A call operation method for a wireless communication device answers an incoming call in response to a user interaction with a user interface or connection of headset to the device and checks a connection state of a headset before initiating an outgoing call.

4 Claims, 4 Drawing Sheets

CALL OPERATION METHOD FOR A COMMUNICATION DEVICE

CROSS-REFERENCE TO RELATED APPLICATIONS

Not applicable.

BACKGROUND OF THE INVENTION

The present invention relates to communication devices and, more particularly, to a call operation method for a wireless voice communication device that utilizes a selectively connectable voice interface, such as a removable headset.

Headsets add convenience and utility to wireless communication devices, such as cellular telephones, cordless phones, and cellular modem cards for portable computers and personal digital assistants (PDAs). A headset provides a voice interface that permits "hands free" voice input to and output by the wireless device allowing the user to engage in a manual task while engaged in voice communication. For example, with a headset a service technician can troubleshoot or repair a machine while receiving technical support over the telephone. Hands free operation may also be required for cellular phones used in motor vehicles as a result of proposed legislation prompted by an apparent concurrence of traffic accidents and cellular phone use. In some cases, the user must rely entirely on a headset for voice communication because a built-in speaker or microphone is not included in the wireless communication device.

Both wired and wireless headsets are available for wireless communication devices. Wireless headsets are relatively expensive and require their own powered radio transceiver making a wire a common interface between the headset and the communication device. However, a wired headset is not easily stored and can become tangled or interfere with the portability of the communication device. Therefore, wired headsets are typically disconnected from the communication device when not in use. This is particularly so with devices such as modem cards for portable computers and PDAs where voice communication characteristically constitutes only a minor part of the usage of the computer or PDA. When a telephone call is received, the user typically must locate the headset, connect it to the communication device, and respond to the incoming call at a user interface. These actions must be completed in a short period of time or the caller may hang up resulting in a missed call. On the other hand, an answering system may intervene, requiring the user to contact the answering system to identify the caller and place a return call. The time required to prepare the communication device to receive a call is particularly critical when the communication device does not include a built-in speaker or microphone. If the user cannot perform the tasks necessary to prepare the communication device to receive or initiate calls in a timely fashion, user frustration with the communication device is the likely result.

What is desired therefore, is a simpler and more convenient method of using a communication device equipped with a selectively connectable headset.

DETAILED DESCRIPTION OF THE INVENTION

Figure 1:
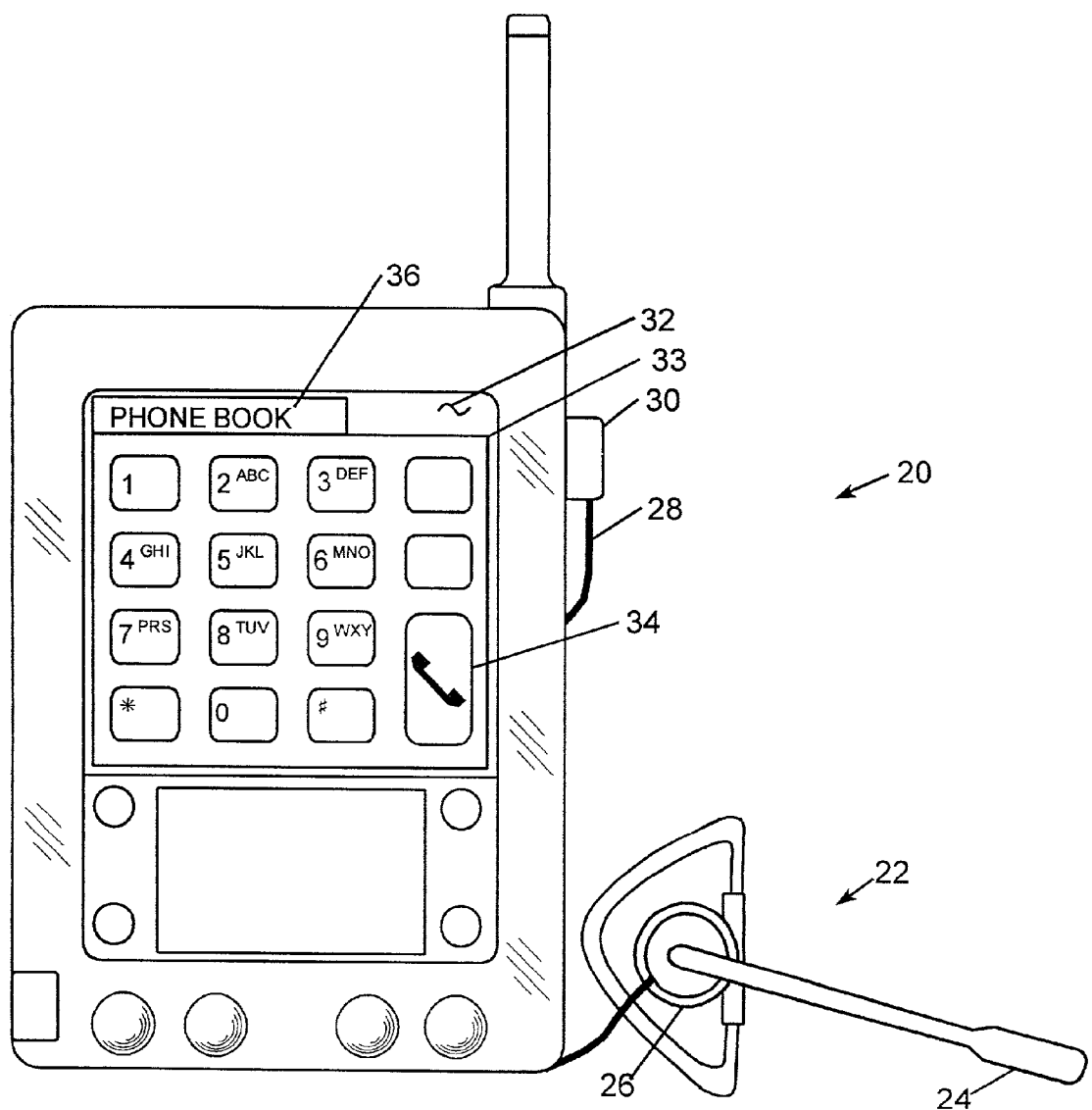
FIG. 1 is a pictorial representation of an exemplary personal digital assistant (PDA) equipped for wireless communication with a headset for voice communication.

Referring to FIG. 1, a wireless communication device can take many forms including, by way of examples, a cellular telephone, a wireless telephone, and a voice capable, wireless modem for a portable computer or a personal digital assistant (PDA) 20. Wireless communication is commonly facilitated by a short range radio interface to a telephone system but may utilize other systems such as longer range radio transmission. The radio or communication hardware may be built into the PDA 20 or provided as a removable accessory. Many wireless communication systems provide for both voice communication and data communication, enabling portable web surfing, text messaging, and e-mail as well as telephony. The voice interface is commonly provided by a selectively connectable headset 22 that includes an earphone 26 for audible output and a microphone 24 for audible input to the communication device. The wireless device may also be equipped with a built-in microphone or speaker, but often the removable headset is the sole voice interface provided with the device. The headset may be a wireless device, but for cost and other reasons is typically connected to the wireless communication device with a wire 28 which terminates in a mating half of a selectively engagable headset jack 30.

Figure 2:
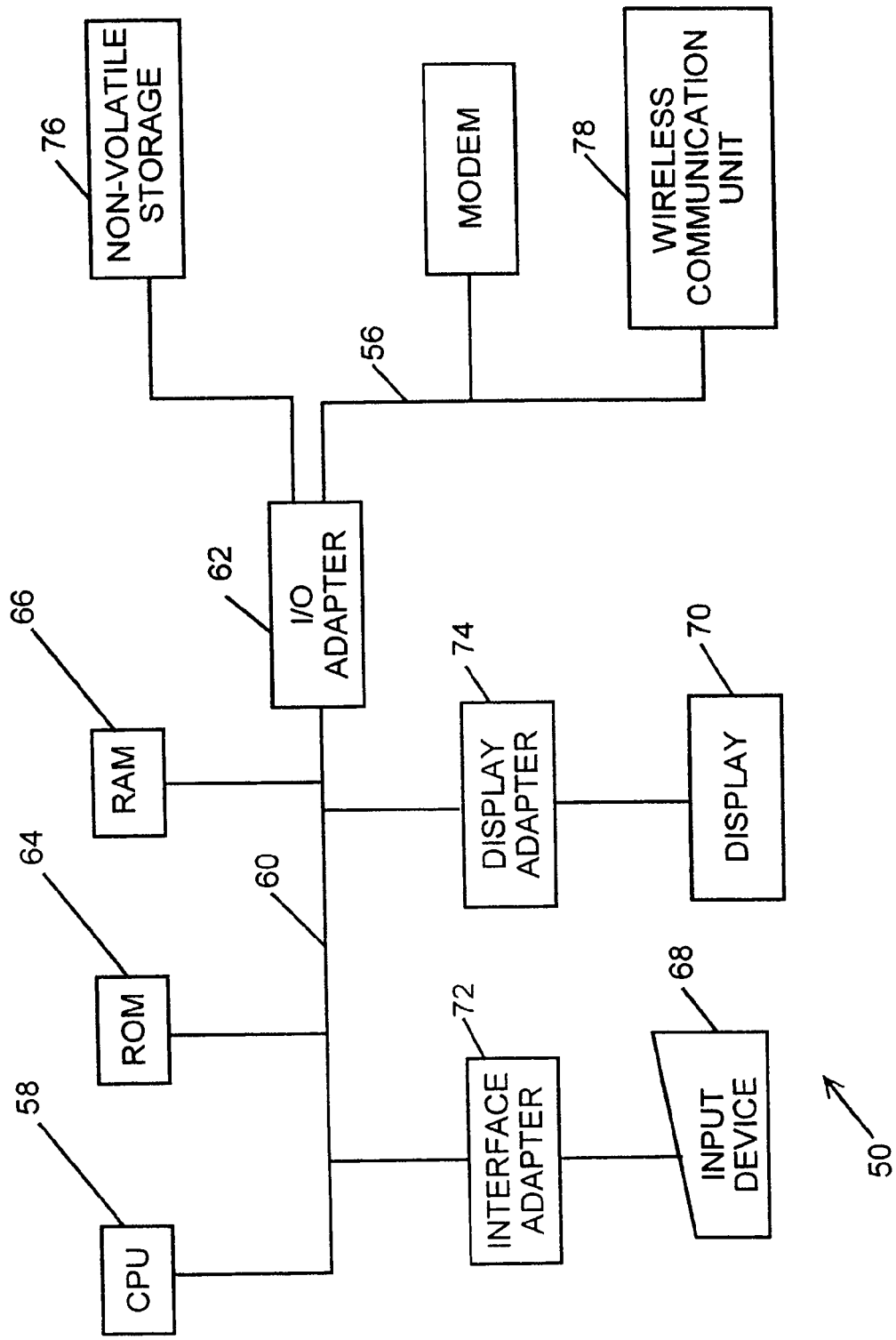
FIG. 2 is a block diagram of the control system of an exemplary wireless communication device.

FIG. 2 is a block diagram of a controller 50 for a digital wireless communication device. The communication device is typically controlled by a microprocessor-based, central processing unit (CPU) 58 that fetches data and instructions from a plurality of sources, processes the data according to the instructions, and either stores the results or transmits the results to a peripheral device for display to the user or further transmission. Typically, the basic operating instructions used by the CPU 58 are stored in nonvolatile storage, such as ROM 64. Data and application programs, including a call operation program used in communication, are typically stored in a nonvolatile memory device 76, such as a disk storage unit or flash memory card. The program instructions and data are generally transferred from the nonvolatile storage 76 to random access memory (RAM) 66 and then transferred from RAM 66 to the CPU 58 over an internal bus 60.

The CPU 58 is typically connected to one or more input 68 and output devices. Input devices 68 may include a keyboard, a keypad, and a pointing device, such as a mouse, track ball, touch pad, or joy stick, for moving a cursor displayed on a display device 70. Input devices are generally connected to the internal bus 60 by an interface adapter 72. Output devices typically include a display 70 which is connected to the internal bus by a display adapter 74. The system may include one or more peripheral devices, such as a wireless communication unit 78. The wireless communication unit 78 commonly provides both data and voice communication services and typically comprises a short range radio or infrared transceiver to facilitate a communication channel and signal processing hardware and firmware to convert voice and data signals to signals appropriate for the communication channel. An external data interface 56 and an input-output (I/O) adapter 62 typically provide the interface between the peripheral devices, such as the wireless communication unit 78, and the internal bus 60.

Since wireless communication devices take many forms, their control systems and peripheral equipment can vary substantially in execution. For instance, a user interface generally comprises an input device 68 to accept user input often in connection with a display to indicate the effect of the user input. For example, a portable computer may utilize a keyboard, a pointing device, and a graphical user interface (GUI) as a user interface. The user interface of a cellular telephone typically relies substantially on switches located on a keypad for user input because of the small size of the phone and its display. On the other hand, a PDA, such as the PDA 20, typically relies heavily on a graphical user interface (GUI) and a contact-sensitive display 33 for user input because the small size and portability of the device rules out a keyboard and a pointing device.

Typically, when an incoming call is detected by a wireless communication device, the user must respond to the "ringing" phone by locating and connecting a removable headset to the device and by undertaking a responsive action at the user interface, such as touching the CALL button 34 on the display 32 of the PDA 20. The time required to perform this combination of actions is often sufficient to either cause the caller to hang up or an answering machine or service to intervene. If an answering system responds to the caller, the user will be required to contact the answering system to identify the caller and then place a return call. Frustration resulting from missed calls is a frequent experience for users of wireless devices equipped with headsets. The present inventor concluded that user frustration with wireless communication devices could be substantially reduced if the actions necessary to answer or initiate a call could be streamlined and made more convenient.

Figure 3:
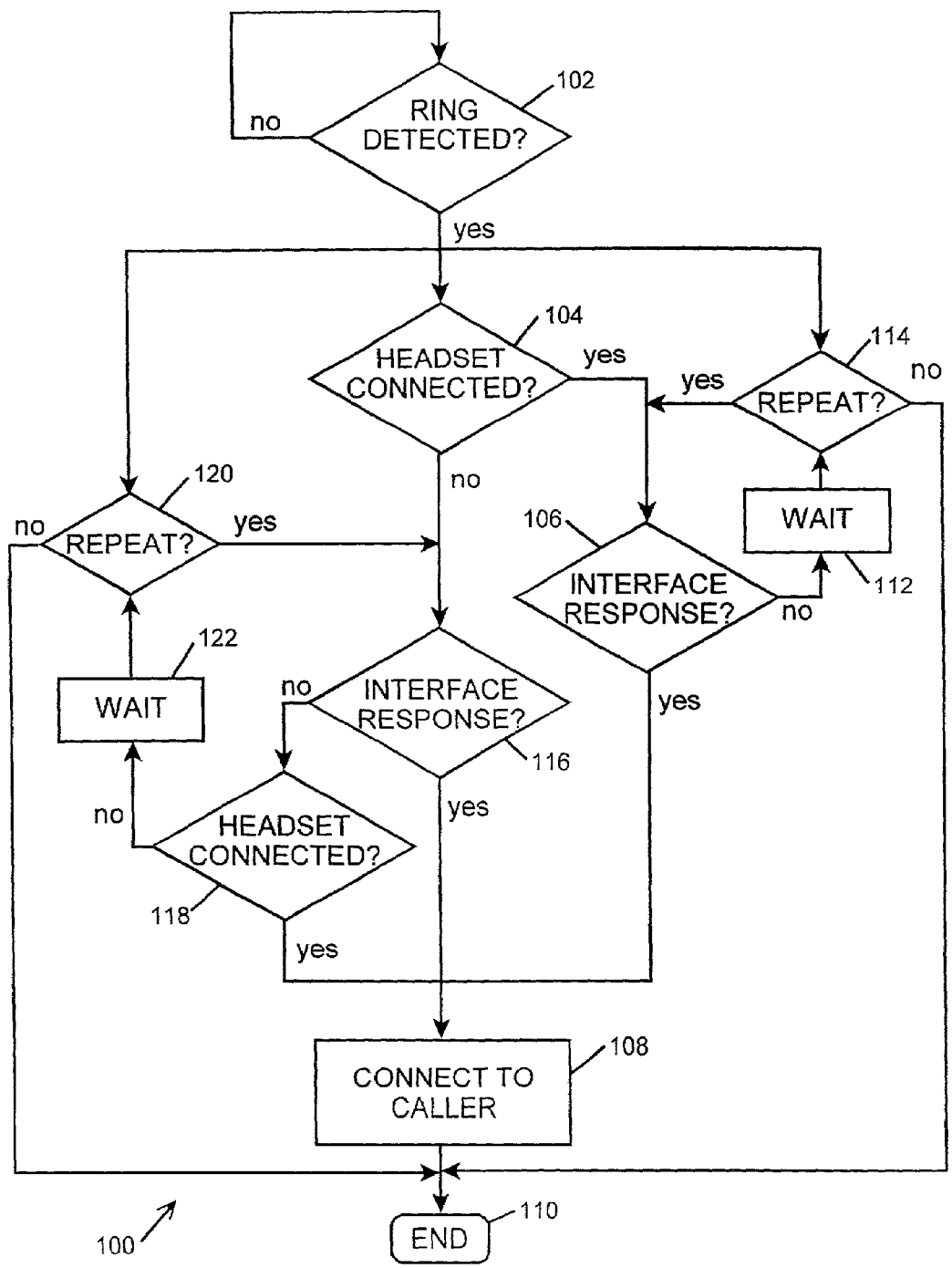
FIG. 3 is a flow chart of the call receiving method of the call operation of the present invention.

Referring to FIG. 3, in a wireless communication device incorporating the call answering routine 100 of the present invention, the receiver portion of the wireless unit 78 is monitored to detect a "ring" signaling an incoming call 102. When a ring is detected, the controller 50 loads a call answering routine 100 of a call operation program stored in the device. In response to instructions in the call answering routine 100, the controller 50 tests to determine a connection state of the selectively connectable voice interface, headset 104. Typically, the connection state of the headset is determined by measuring an impedance between conductors in the headset jack 30. However, the headset jack may be constructed so that physical engagement of the mating halves is detected providing a signal indicating headset connection. For example, a switch may be arranged so that it is actuated when the connector halves of the headset jack are engaged. If the connection state of the headset is "connected" 104, the controller 50 checks for a response to the ringing at the user interface 106 of the device. The response at the user interface 106 may comprise, for examples, depressing a switch or selecting an icon, such as the CALL button 34, displayed on a GUI on the device's display. If the user responds through the user interface 106, the controller 50 connects to the calling device 108 and the call answering routine is completed 110. On the other hand, if the user does not pick up the call at the user interface 106, the system waits 112 for a period of time and then, if the caller has not terminated the call or an answering service has not intervened, checks the user interface again for a user response 114.

On the other hand, if the controller 50 detects that the connection state of the headset is "disconnected" 104 when the ring of an incoming call is detected 102, the controller 50 will also check the device's user interface for a user response to the ringing 116. If a response at the interface 116 is detected, the controller answers the call by connecting the called communication device and the calling device 108. However, if there is no response at the interface to the ringing 116, the controller 50 will again check to determine if the headset is connected 118. If the headset is now connected, the controller will connect the calling and called communication devices 108. If the controller detects that the headset has not been connected 118 and if ringing is still being detected after a delay 122, the user interface will again be checked for a user response 120. If there has been no response at the user interface, the headset connection state will be checked again 118. If the caller has hung up or an answering system has intervened 114 and 120, the call answering routine will end 110.

Figure 4:
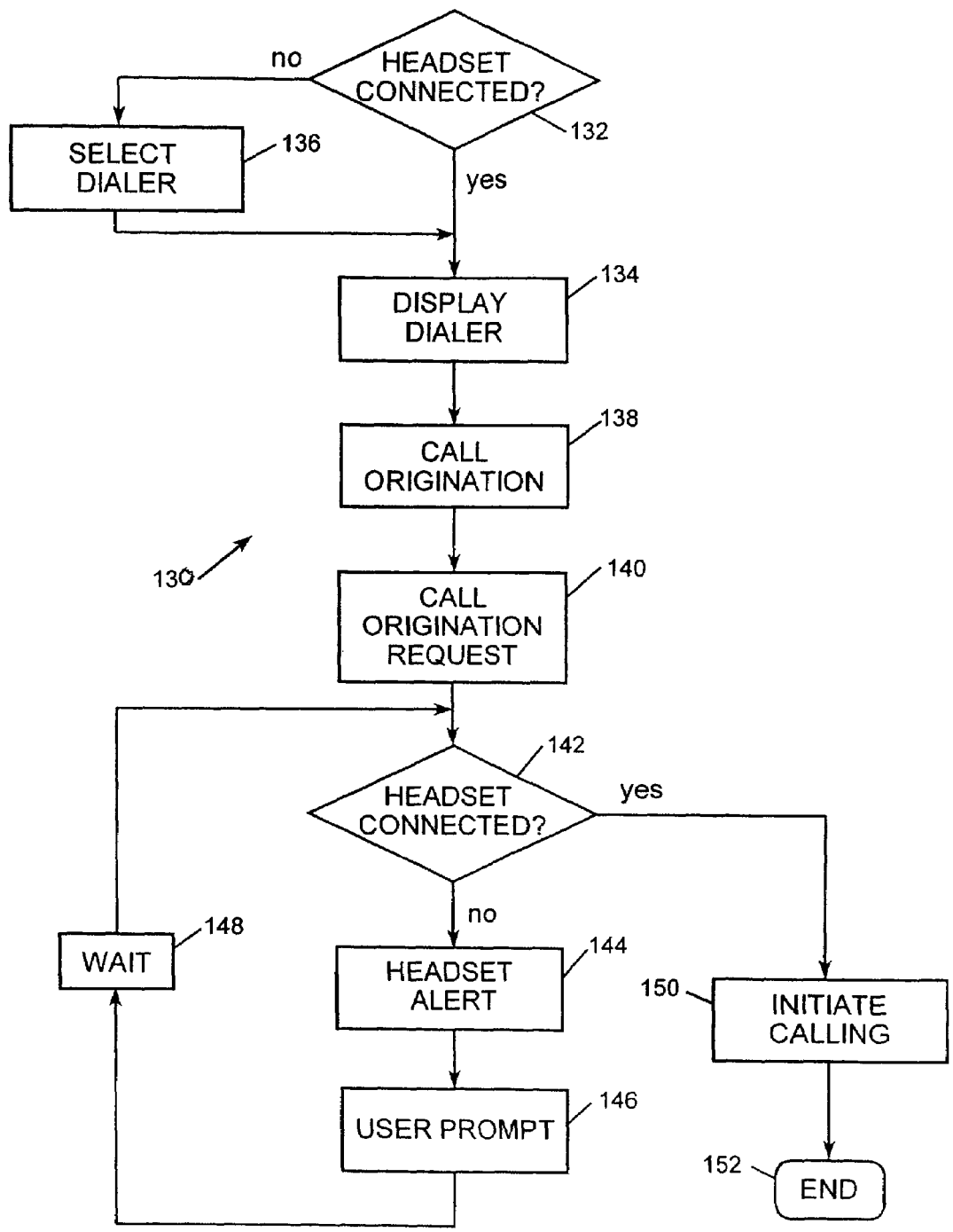
FIG. 4 is a flow chart of the call initiation method of the call operation of the present invention.

Referring to FIG. 4, a call initiation routine 130 of the call operation of the present invention can also be used to facilitate initiating calls from a wireless communication device. For the PDA 20, a call is typically initiated by interaction of the user with a dialer displayed on the user interface. The dialer includes a virtual keypad 32 and a phone book stored in memory and accessed by touching a phone book icon 36. A call can be originated by the user by touching the appropriate numbers rendered as part of the graphical user interface (GUI) on the display 32 or by selecting a phone number stored in the phone book. Typically, the user opens the dialer by selecting an appropriate icon on the top level display of the user interface. However, with the call initiation routine 130 of the present invention, the controller 50 determines the connection state of the voice interface, for example headset 132. If the controller 50 determines that the headset has been connected 132, the controller pops up the dialer without further intervention by the user 134. If the headset is not connected, the user may open the dialer by selecting an icon on the GUI 136. When the dialer is displayed 134, the user may originate a call 138 by selecting displayed virtual buttons or by selecting a number from the phone book and then touching the CALL button 34. In response, the controller 50 generates a call origination request 140 which causes the controller to check the connection state of the headset 142. If the headset is not connected 142, a headset alert signal 144 is returned indicating that the device is not properly configured for voice communication. In response to the headset alert 144, the controller 50 will display a user prompt 146 on the display or produce an audible signal. The controller will then wait 148 for a period of time before rechecking the connection state of the headset 142. Once the headset is connected, the call will be initiated 150 and the call initiation routine is concluded 152.

With the call operation methods of the present invention, a call received by a wireless communication device can be answered either by action taken at the user interface or by connecting the headset to the device eliminating duplicate actions, reducing the time necessary to respond to the call, and reducing the frustration of missed calls. The call operation also makes sure that the headset is connected and the device is ready for voice communication before an outgoing call is initiated.

The detailed description, above, sets forth numerous specific details to provide a thorough understanding of the present invention. However, those skilled in the art will appreciate that the present invention may be practiced without these specific details. In other instances, well known methods, procedures, components, and circuitry have not been described in detail to avoid obscuring the present invention.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

The invention claimed is:

1. A method of initiating a call with a communication device having a selectively connectable voice interface and a user interface, said method comprising the steps of:
    (a) originating a request for said call in response to a user command with said user interface;
    (b) detecting a connection state of said selectively connectable voice interface to determine whether said voice interface is operatively interconnected to said communication device at the time of said request;
    (c) initiating said call in response to a command at said user interface where audio from said call is directed to said selectively connectable voice interface, if said connection state of said selectively connectable voice interface is connected; and
    (d) initiating said call in response to a command at said user interface where audio from said call is directed to said selectively connectable voice interface, if said connection state of said selectively connectable voice interface is disconnected further alerting said user of said disconnected state and awaiting said connected state before said completing said initiating said call without reinitiating said call.

2. The method of claim 1 further comprising the step of initiating said call in response to a change in said connection state from disconnected to connected.

3. The method of claim 1 wherein the step of originating a request for said call in response to a user command comprises the steps of:
    (a) detecting said connection state of said voice interface;
    (b) displaying a dialing interface if said connection state is connected, and
    (c) if said connection state is disconnected, displaying said dialing interface in response to user interaction with said user interface.

4. The method of claim 3 further comprising the step of initiating said call in response to a change in said connection state from disconnected to connected.

* * * * *